US012746726B2

(12) United States Patent
Ruiz-Vargas et al.

(10) Patent No.: US 12,746,726 B2
(45) Date of Patent: *Sep. 29, 2026

(54) TECHNIQUES FOR OPTICAL CONTROL CALIBRATION IN ADDITIVE FABRICATION AND RELATED SYSTEMS AND METHODS

(71) Applicant: Formlabs, Inc., Somerville, MA (US)

(72) Inventors: Carlos Ruiz-Vargas, Waltham, MA (US); Robb Morgan, Arlington, MA (US)

(73) Assignee: Formlabs, Inc., Somerville, MA (US)

( * ) Notice: Subject to any disclaimer, the term of this patent is extended or adjusted under 35 U.S.C. 154(b) by 66 days.

This patent is subject to a terminal disclaimer.

(21) Appl. No.: 18/664,019

(22) Filed: May 14, 2024

(65) Prior Publication Data

US 2024/0416589 A1 Dec. 19, 2024

Related U.S. Application Data

(63) Continuation of application No. 17/386,143, filed on Jul. 27, 2021, now Pat. No. 12,011,881.

(60) Provisional application No. 63/059,344, filed on Jul. 31, 2020.

(51) Int. Cl.

| | |
|---|---|
| ***B29C 64/393*** | (2017.01) |
| ***B33Y 50/02*** | (2015.01) |
| ***G05B 19/4099*** | (2006.01) |
| *B33Y 30/00* | (2015.01) |

(52) U.S. Cl.

CPC ............ *B29C 64/393* (2017.08); *B33Y 50/02* (2014.12); *G05B 19/4099* (2013.01); *B33Y 30/00* (2014.12); *G05B 2219/49023* (2013.01)

(58) Field of Classification Search

CPC ..... B29C 64/393; B29C 64/153; B33Y 50/02; B33Y 30/00; B33Y 10/00; G05B 19/4099; G05B 2219/49023; G05B 2219/37067; G05B 2219/37129; B22F 12/49;

(Continued)

(56) References Cited

U.S. PATENT DOCUMENTS

| | | | | |
|---|---|---|---|---|
| 10,994,490 | B1 * | 5/2021 | Matusik | B29C 64/245 |
| 11,766,831 | B2 * | 9/2023 | Matusik | B33Y 30/00 700/98 |
| 12,011,881 | B2 * | 6/2024 | Ruiz-Vargas | B22F 10/31 |

(Continued)

*Primary Examiner* — Jonathan M Hansen

(74) *Attorney, Agent, or Firm* — Michael J. Attisha; Greenberg Traurig, LLP

(57) ABSTRACT

Techniques are described for calibrating an optical system in an additive fabrication device using an image of the build surface within the device. These techniques allow calibration to be performed by imaging one or more calibration features generated on (or at) the build surface, which may include illuminated regions of the build surface, regions of the build surface on which solid material has been formed, and/or regions of the build surface to which energy has otherwise been directed thereby making those regions distinguishable from their surroundings. The calibration features may be produced (at least in part) by the optical system to be calibrated. The location of the calibration features within the image may be compared with the intended location of these calibration features, and corrections to the optical system determined based on any differences between the actual and intended locations.

22 Claims, 10 Drawing Sheets

(58) Field of Classification Search
CPC .......... B22F 10/28; B22F 10/31; B22F 12/90; Y02P 10/25
See application file for complete search history.

(56) References Cited

U.S. PATENT DOCUMENTS

| | | | | |
|---|---|---|---|---|
| 2016/0023403 | A1* | 1/2016 | Ramos | B33Y 10/00 425/171 |
| 2021/0129441 | A1* | 5/2021 | Dicken | B29C 64/135 |
| 2024/0075529 | A1* | 3/2024 | Cavalcabo | B33Y 10/00 |
| 2024/0416589 | A1* | 12/2024 | Ruiz-Vargas | B22F 10/31 |

* cited by examiner

TECHNIQUES FOR OPTICAL CONTROL CALIBRATION IN ADDITIVE FABRICATION AND RELATED SYSTEMS AND METHODS

CROSS REFERENCE TO RELATED APPLICATIONS

The present application is a continuation under 35 U.S.C. § 120 of U.S. application Ser. No. 17/386,143, filed Jul. 27, 2021, which claims the benefit under 35 U.S.C. § 119 (e) of U.S. Provisional Patent Application No. 63/059,344, filed Jul. 31, 2020, each of which is hereby incorporated by reference in its entirety.

BACKGROUND

Additive fabrication, e.g., 3-dimensional (3D) printing, provides techniques for fabricating objects, typically by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, selective laser sintering or combinations thereof. Many additive fabrication techniques build parts by forming successive layers, which are typically cross-sections of the desired object. Typically each layer is formed such that it adheres to either a previously formed layer or a substrate upon which the object is built.

In one approach to additive fabrication, known as selective laser sintering, or "SLS," solid objects are created by successively forming thin layers by selectively fusing together powdered material. One illustrative description of selective laser sintering may be found in U.S. Pat. No. 4,863,538, incorporated herein in its entirety by reference.

SUMMARY

According to some aspects, an additive fabrication device is provided configured to fabricate parts from a source material, the additive fabrication device comprising an optical system configured to direct light onto the source material, an image sensor configured to receive light produced from the source material, at least one processor, and at least one computer readable medium comprising instructions that, when executed by the at least one processor control the optical system to direct light onto the source material, thereby producing one or more calibration features on the source material, using the image sensor, generate an image of the one or more calibration features on the source material, and determine one or more optical corrections to the optical system based on positions of the one or more calibration features within the image.

According to some aspects, a method is provided of calibrating an optical system of an additive fabrication device configured to fabricate parts from a source material, the method comprising controlling, using at least one processor, an optical system to direct light onto the source material, thereby producing one or more calibration features, generating, using an image sensor, an image of the one or more calibration features on the source material, and determining, using the at least one processor, one or more optical corrections for the optical system based on positions of the one or more calibration features within the image.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

Figure 1:
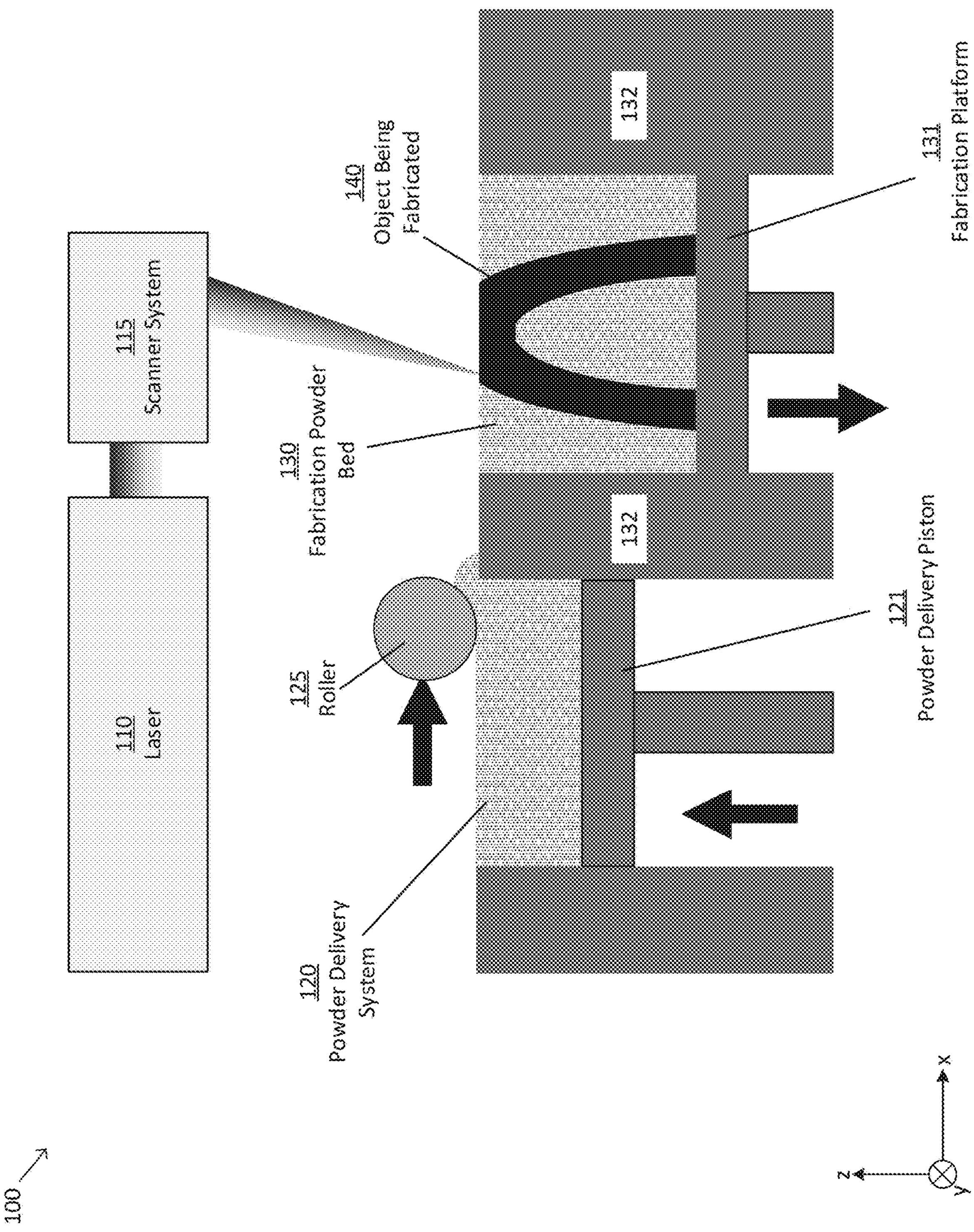
FIG. 1 depicts an illustrative selective laser sintering device, according to some embodiments.

Some additive fabrication techniques, such as Selective Laser Sintering (SLS), form objects by fusing fine material, such as one or more powders, together into larger solid masses. This process of fusing fine material together is referred to herein as "sintering" or "consolidation," and typically occurs by directing sufficient energy (e.g., heat and/or light) to the material to cause consolidation. Some energy sources, such as lasers, allow for direct application of energy onto a small area or volume. Other energy sources, such as heat beds or heat lamps, direct energy into a comparatively broader area or volume of material.

In additive fabrication systems that rely on directed optical systems, such as laser optical systems, the accuracy of the parts produced by the system directly depends on the ability of the optical system to accurately direct light to desired locations. For instance, in an SLS device, producing parts accurately may depend on accurately directing a laser beam to a particular location on a powder bed to cause consolidation of the powder at that location. In some cases, however, the accuracy of an optical system may change over time, even after an initial calibration. For example, thermal changes within the system and/or other physical disruptions may cause the alignment of an optical system to drift, leading to the fabrication of less accurate parts. As a result, without further calibration to the optical system, the system may be directing light to a location on the powder bed that is different from the expected location.

Some conventional additive fabrication devices may utilize scanning techniques to scan a fixed target within the device and receive scattered light from the target at a suitable sensor. These approaches may be inaccurate, however. Scanning a target within the device may not necessarily provide accurate calibration information for the purposes of fabrication because the target may be in a different location than the source material during fabrication. For example, in an SLS device, a target located on a structural component of the device may be scanned to detect drift in the optical system. However, calibrating the optical system for this target may not necessarily accurately calibrate the optical system with respect to the powder bed, because the bed and the target are in different locations. In cases in which the target is closer to the optical system than the bed, for example, to detect a drift in the optical system of a given size a smaller drift must be detected in the position of the target. Furthermore, heat generated may cause structures of the device to expand and/or distort, such that the relative positions of the powder bed and target(s) may change. As a result of either or both of these issues, it may be possible to detect no drift by scanning the target when in reality there is a drift in the optical system with respect to the powder bed.

The inventors have recognized and appreciated techniques for calibrating an optical system in an additive fabrication device using an image of the build surface within the device. These techniques allow calibration to be performed by imaging one or more calibration features generated on (or at) the build surface, which may include illuminated regions of the build surface, regions of the build surface on which solid material has been formed, and/or regions of the build surface to which energy has otherwise been directed thereby making those regions distinguishable from their surroundings (e.g., partially sintered regions or heated regions). Irrespective of which approach is used to generate the calibration features, the calibration features may be produced (at least in part) by the optical system to be calibrated. The location of the calibration features within the image may be compared with the intended location of these calibration features, and corrections to the optical system determined based on any differences between the actual and intended locations.

According to some embodiments, a calibration process may utilize a known mapping between locations on a build surface (e.g., the surface of a powder bed in an SLS device) and corresponding locations within an image taken by an imaging device. The mapping may thereby describe a relationship between pixel coordinates in the image and coordinates of the two-dimensional build surface. Based on this mapping, the position on the build surface of a calibration feature may be determined by first identifying the position of the calibration feature in the image, then applying the mapping. This mapping may be generated in various ways, such as by inserting a calibration plate into the additive fabrication device that includes calibration features at known positions on the plate. Assuming that the plate may be made with precise dimensions and/or arranged in the device at a precise position, the mapping may be generated or updated by taking an image of the plate and noting the pixel locations of the calibration features on the plate.

According to some embodiments, a calibration process may generate a mapping between one or more control values of an optical system and locations on a build surface (e.g., the surface of a powder bed in an SLS device). This mapping may thereby describe a relationship between coordinates of the two-dimensional build surface and the control value(s) of the optical system. When producing calibration features with the optical system, the optical system may be controlled based on the control value(s) to produce calibration features at expected positions on the build surface based on the mapping. During calibration, by measuring the actual positions of the calibration features and comparing them to the expected positions, a correction to this mapping may be produced.

According to some embodiments, an additive fabrication device may comprise, and/or may be configured to produce, one or more static reference marks (also referred to herein as fiducial targets). A fiducial target refers generally to a calibration feature that is generated independently of the optical system used to produce solid material, and which may be relied upon to determine whether the imaging device has shifted in position and/or orientation. Without the fiducial targets, determining that the position of a calibration feature within the image is different from expected could mean that the optical system has drifted, but could also (or alternatively) mean that the imaging device's position and/or orientation has changed. By identifying the position of the fiducial targets within an image taken by the imaging device, changes in the position and/or orientation of the imaging device may be recognized by changes in the location of the fiducial targets within the image. Since the calibration process described herein is robust in this manner, this may allow a comparatively lower quality mount to be utilized for the imaging device.

According to some embodiments, calibration features may include any regions that may be distinguished from their surroundings in an image taken by the imaging device. For instance, the calibration features may include spots of light generated by the optical system and/or may include regions of solid material produced by directing the optical system onto the build surface (e.g., consolidated material formed by directing light onto the powder bed in an SLS device). In some embodiments, the calibration process may include one or more image processing operations to more clearly identify the bounds of the calibration features in the image, such as contrast adjustments, thresholding, noise removal, or combinations thereof. The calibration features may be brighter than their surroundings in some instances (e.g., when generated by spots of light) or may be darker than their surroundings in other instances (e.g., when generated by forming solid material). In some cases, the calibration features may differ in hue and/or saturation of color from their surroundings (and may or may not differ in brightness). For instance, the calibration features may be produced by colored spots of light and may be identified from an image by examining color rather than brightness.

The calibration processes described herein may be performed at various different times, including during an initial calibration of the additive fabrication device, between fabrication operations by the device, and/or during a fabrication operation (e.g., between layers). In some cases, fabrication may be aborted (or a user may be warned) as a result of the device determining that a drift in the optical system has occurred during fabrication. In some cases, the magnitude of the drift is determined and a user is warned or fabrication is aborted when the magnitude is above a preselected threshold. In some cases, a correction may be automatically made to the optical system to correct or otherwise mitigate the detected drift in the optical system.

While the calibration techniques described herein are not limited to use in an SLS device, the subsequent description focuses on SLS devices for purposes of explanation only. An illustrative system embodying certain aspects of the present application is depicted in FIG. 1. An illustrative selective laser sintering (SLS) additive fabrication device 100 comprises a laser 110 paired with a computer-controlled scanner system 115 disposed to operatively aim the laser 110 at the fabrication bed 130 and move over the area corresponding to a given cross-sectional area of a computer aided design (CAD) model representing a desired part. Suitable scanning systems may include one or more mechanical gantries, linear scanning devices using polygonal mirrors, and/or galvanometer-based scanning devices.

In the example of FIG. 1, the material in the fabrication bed 130 is selectively heated by the laser in a manner that causes the powder material particles to fuse (sometimes also referred to as "sintering" or "consolidating") such that a new layer of the object 140 is formed. According to some embodiments, suitable powdered materials may include any of various forms of powdered nylon. Once a layer has been successfully formed, the fabrication platform 131 may be lowered a predetermined distance by a motion system (not pictured in FIG. 1). Once the fabrication platform 131 has been lowered, the material deposition mechanism 125 may be moved across a powder delivery system 120 and onto the fabrication bed 130, spreading a fresh layer of material across the fabrication bed 130 to be consolidated as described above. Mechanisms configured to apply a consistent layer of material onto the fabrication bed may include the use of wipers, rollers, blades, and/or other levelling mechanisms for moving material from a source of fresh material to a target location. Additional powder may be supplied from the powder delivery system 120 by moving the powder delivery piston 121 upwards.

Since material in the powder bed 130 is typically only consolidated in certain locations by the laser, some material will generally remain within the bed in an unconsolidated state. This unconsolidated material is sometimes referred to as the part cake. In some embodiments, the part cake may be used to physically support features such as overhangs and thin walls during the formation process, allowing for SLS systems to avoid the use of temporary mechanical support structures, such as may be used in other additive manufacturing techniques such as stereolithography. In addition, this may further allow parts with more complicated geometries, such as moveable joints or other isolated features, to be printed with interlocking but unconnected components.

The above-described process of producing a fresh layer of powder and consolidating material using the laser repeats to form an object layer-by-layer until the entire object has been fabricated. Once the object has been fully formed, the object and the part cake may be cooled at a controlled rate so as to limit issues that may arise with fast cooling, such as warping or other distortion due to variable rate cooling. The object and part cake may be cooled while within the selective laser sintering apparatus, or removed from the apparatus after fabrication to continue cooling. Once fully cooled, the object can be separated from the part cake by a variety of methods. The unused material in the part cake may optionally be recycled for use in subsequent prints.

In the example of FIG. 1, powder in the uppermost layer of the powder bed 130 is maintained at an elevated temperature, low enough to minimize thermal degradation, but high enough to require minimal additional energy exposure to trigger consolidation. Energy from the laser 110 is then applied to selected areas to cause consolidation.

While the illustrative SLS device of FIG. 1 includes a laser as a source of directed energy, it will be appreciated that other SLS devices may rely on other sources of energy to cause consolidation of material. For instance, some SLS devices may utilize a two-dimensional array of independent energy sources, such as infra-red LEDs, and turn on selected ones of the LEDs to direct energy to selected regions of a powder bed. Other SLS devices may heat a portion of the powder bed while applying additional energy to selected regions of the powder bed and thereby cause consolidation. The calibration techniques described herein may readily be applied to such devices as well.

Figure 2A:
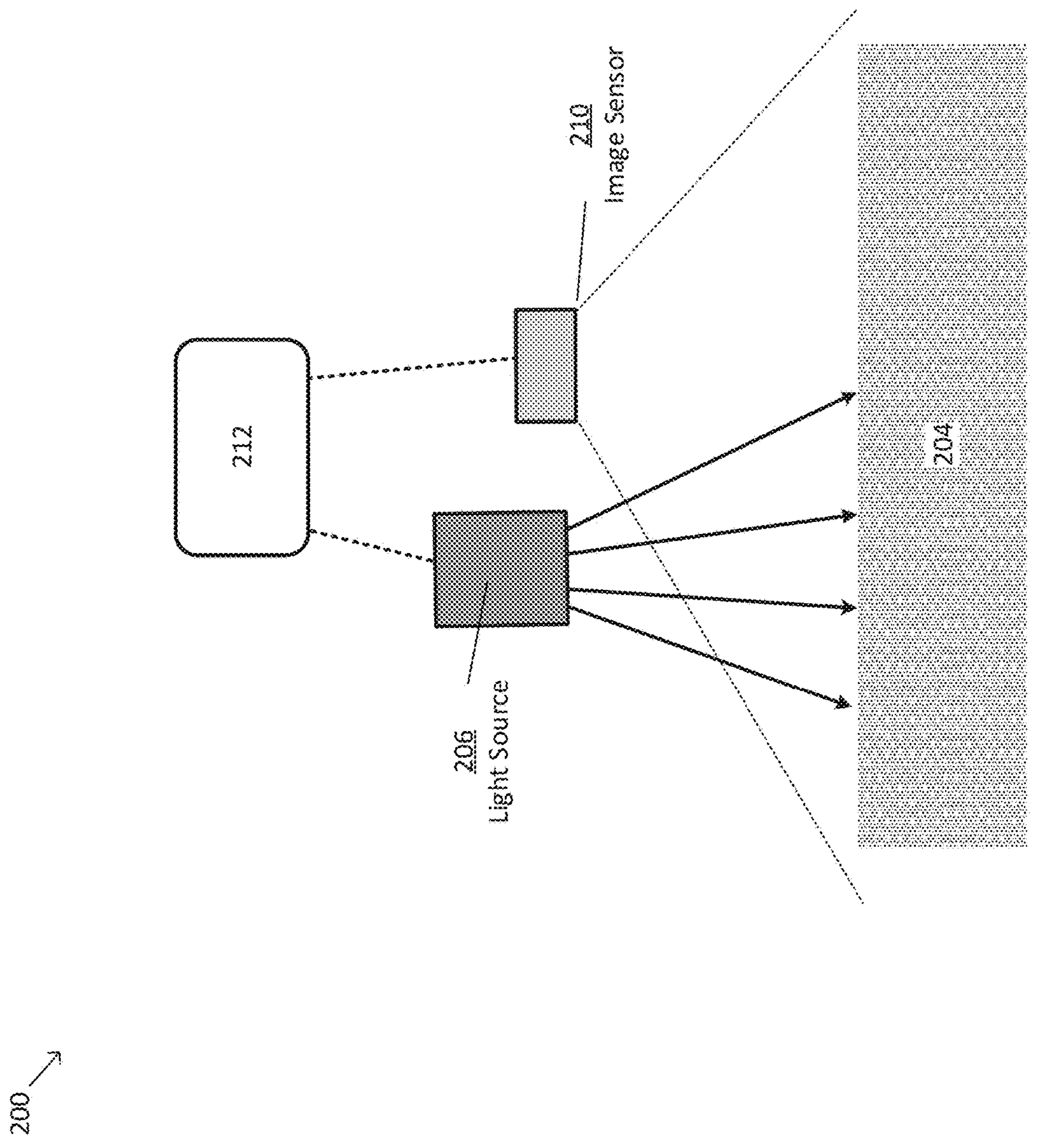
FIG. 2A depicts a schematic view of a light source and image sensor for calibration of an optical system, according to some embodiments.

FIG. 2A depicts a schematic view of a light source and image sensor for calibration of an optical system, according to some embodiments. In the example of FIG. 2A, additive fabrication device 200 comprises a light source 206 configured to direct light onto a source material 204, and an image sensor 210 configured to image the surface of the source material. The light source 206 may be configured to consolidate material within the source material 204 in addition to producing calibration features on or within the source material (as noted above, producing calibration features may include directing light onto the surface to produce a bright spot and/or directing light onto the surface to consolidate source material). Additive fabrication device 200 also includes a controller 212 configured to operate the light source 206, the image sensor 210, and to analyze image data produced by the image sensor to determine the position of calibration features and/or any fiducial targets within the device (fiducial targets are not depicted in the example of FIG. 2A).

During calibration, the light source 206 directs light onto the source material 204 and produces one or more calibration features on or within the source material that may be visible to the image sensor 210. The image sensor 210 captures image data of the source material and controller 212 analyzes the image data from the image sensor to determine the positions of calibration features within the image data, and to determine calibration values for controlling the light source 206 based on the determined positions.

The light source 206 and at least the aspects of controller 212 that control the light source 206 during fabrication may be referred to collectively herein as the "optical system" of the additive fabrication device 200. The optical system may also include other components not shown in FIG. 2A, such as various lenses, mirrors, etc. that may be passive and/or may be controlled by the controller 212 to direct light from the light source 206. The calibration process is thereby a process of calibrating the optical system in that the manner in which the controller 212 controls the light source 206 is calibrated. For instance, the controller 212 may provide one or more control values to the light source (or optical components associated with the light source) to control where the light source directs light. Calibration of the optical system may comprise calibrating how the controller selects these control values when light is to be directed to a particular location (or locations) on the surface of the source material 204.

According to some embodiments, light source 206 may include a scanning or pixelated light source, a laser (which may be, for instance, steered with one or more galvanometers and/or a rotating polygonal mirror), a digital light processing (DLP) device, a liquid-crystal display (LCD), a liquid crystal on silicon (LCoS) display, a light emitting diode (LED), an LED array, a scanned LED array, or combinations thereof. Moreover, additional optical components may be arranged in the path of light emitted by the light source 206 so as to direct light toward a desired position on the optical window, such as, but not limited to, one or more lenses, mirrors, filters, galvanometers, or combinations thereof.

According to some embodiments, light source 206 may be configured to produce light within any suitable range of wavelengths. For instance, light source 206 may be configured to emit visible light and infrared light, infrared light only, or visible light only. The range of wavelengths over which light source 206 is configured to emit light may be dictated by the process by which the light source produces light and/or by including one or more filters between the light source and the source material 204. In some embodiments, the light source 206 is configured to produce near infrared light. In some embodiments, the light source 206 may comprise a laser configured to produce an infrared beam of light, including but not limited to near infrared light.

As noted above, light source 206 may be configured to consolidate source material 204 in addition to being configured to produce calibration features as described above. For instance, in SLS device 100 shown in FIG. 1, the light source 206 may be the laser 110 and may be operated to produce calibration features as well as sinter the source material as discussed in relation to FIG. 1. In some embodiments, the light source may be operable in different modes while sintering or producing light to also produce calibration features. For instance, the light source may be operated at a different power and/or over a different frequency spectrum in each of the two modes.

In some embodiments, additive fabrication device 200 may include an additional light source configured to produce fiducial targets on the source material 204, examples of which are discussed below. The image sensor 210 may also be configured to image any fiducial targets that are marked or otherwise attached to the additive fabrication device itself, examples of which are also discussed below.

According to some embodiments, image sensor 210 may comprise any device suitable for imaging the surface of the source material 204, such as a camera (e.g., CCD or CMOS sensor) or an array of photodiodes.

Figure 2B:
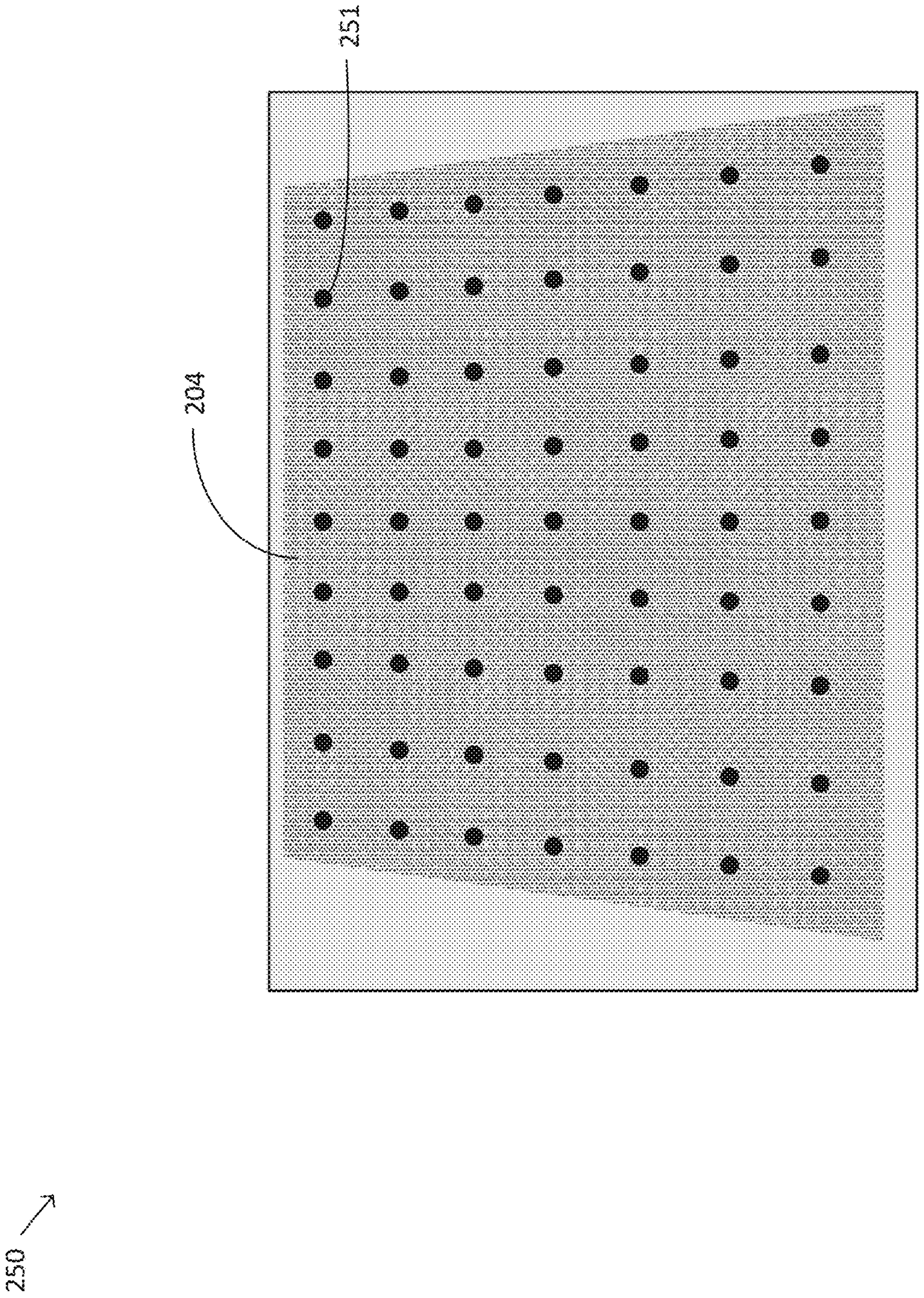
FIG. 2B depicts an illustrative image of calibration features produced within an additive fabrication device, according to some embodiments.

For purposes of illustration, FIG. 2B depicts an illustrative image of calibration features that may be produced by additive fabrication device 200 shown in FIG. 2A. As shown in image 250, a series of darker regions 251 are visible on the source material 204. The example of FIG. 2B may therefore represent a use case in which the light source 206 is directed to produce calibration features 251 by consolidating regions of the source material 204. Each of the calibration features 251 occupies a particular position within the image (e.g., pixel coordinates) and as a result of predetermined mappings as discussed above, the controller 212 may determine the corresponding position on the surface of the source material for each of these calibration features, and further determine whether the targets are in expected positions or not.

Figure 2C:
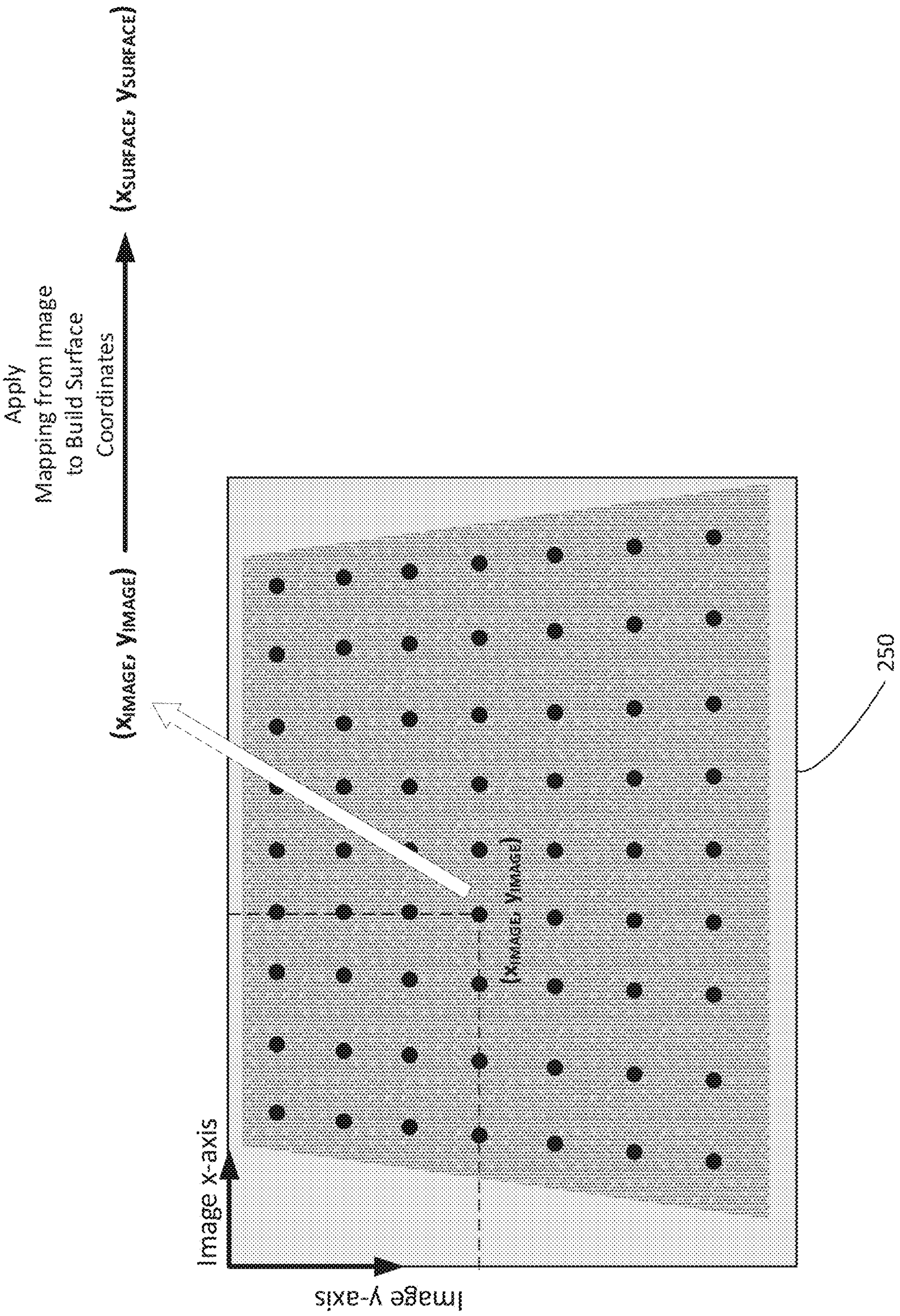
FIG. 2C depicts application of a mapping to determined locations of calibration features within the image of FIG. 2B, according to some embodiments.

As discussed above, and as shown in FIG. 2C, a controller (e.g., a general purpose computer, a controller of the additive fabrication device, etc.) may analyze the image 250 to determine the image coordinates of one or more of the calibration features visible in the image. These coordinates, referred to as ($x_{image}$, $y_{image}$) in the example of FIG. 2C, are transformed into build surface coordinates ($x_{surface}$, $y_{surface}$) through application of the predetermined mapping between these two coordinate systems.

Figure 3A:
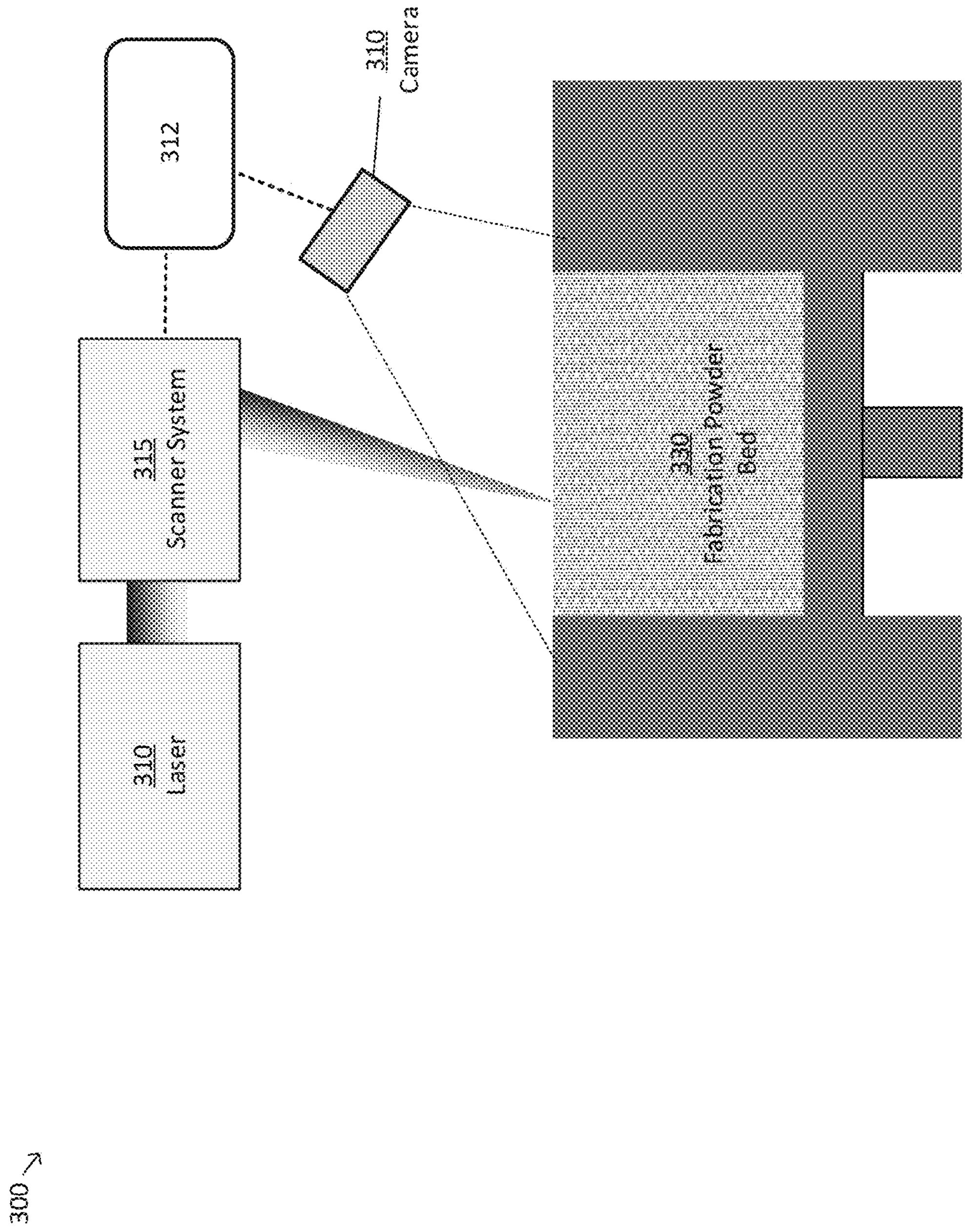
FIG. 3A depicts an illustrative selective laser sintering device in which a laser-based optical system may produce features for calibration, and which may be calibrated based on an image of said features, according to some embodiments.

FIG. 3A depicts an illustrative selective laser sintering device in which a laser-based optical system may produce features for calibration, and which may be calibrated based on an image of said features, according to some embodiments. The example of FIG. 3A depicts additive fabrication device 200 shown in FIG. 2A in which the device is a selective laser sintering device and the light source 206 is a laser 310.

In the example of SLS device 300, the optical system that includes laser 310 and scanner system 315 may be operated by controller 312, which controls the scanner system 315 to direct light onto desired locations on the powder bed 330. For instance, the controller 312 may control one or more mirror galvanometers and/or other optical components within the scanner system 315 to control the direction in which light is directed. In addition, the controller 312 controls camera 310 to produce images of the surface of the powder bed 330. As discussed above in the more general case, therefore, the optical system of device 300 may be operated to produce calibration features, and the camera 310 operated to image the calibration features and determine whether the targets are in the expected locations or not. If they are not, corrections to the manner in which the controller 312 controls the optical system may be generated and applied to the controller.

Figure 3B:
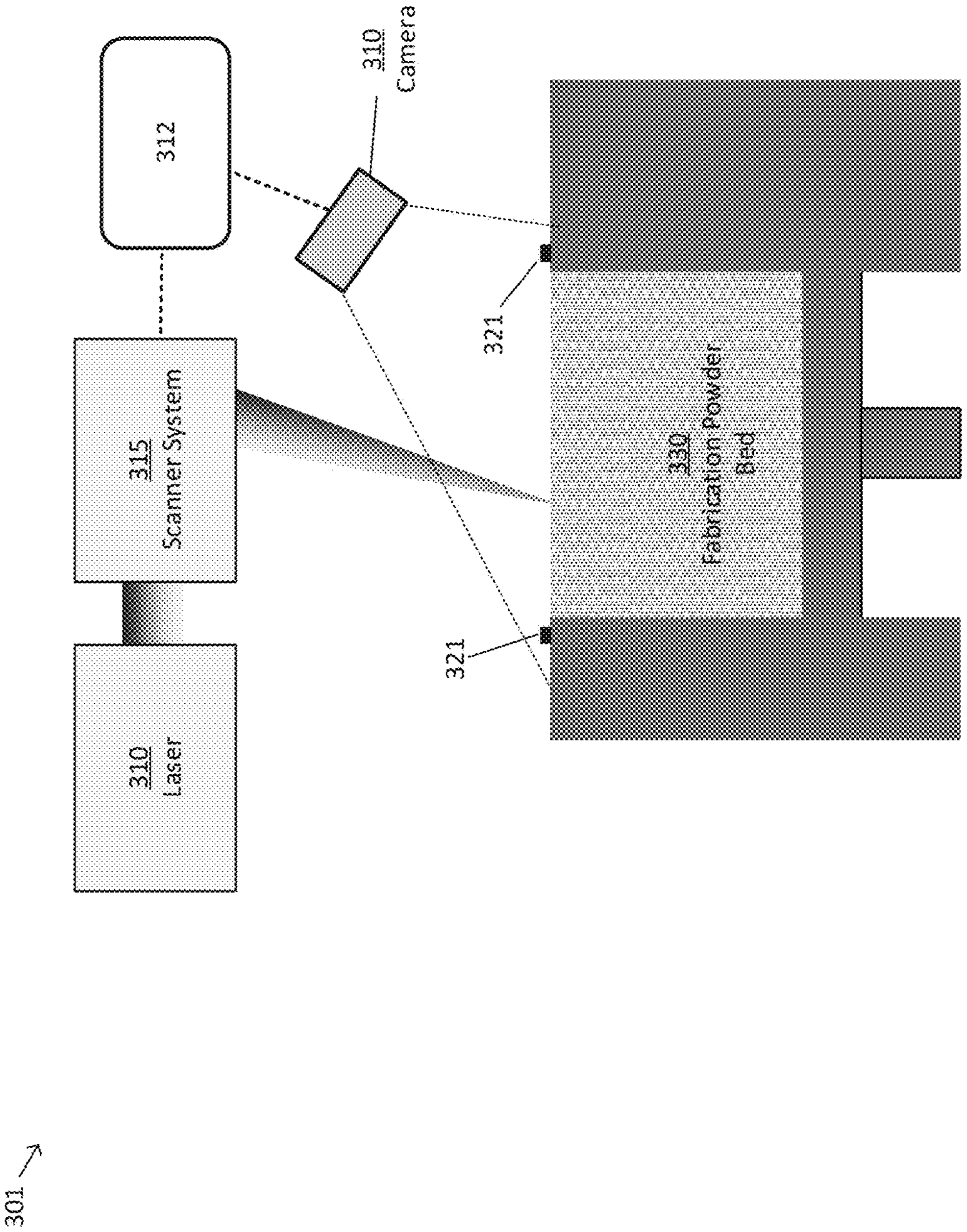
FIG. 3B depicts an illustrative selective laser sintering device in which a laser-based optical system may be calibrated based at least in part on an image of static reference marks, according to some embodiments.

FIG. 3B depicts an illustrative selective laser sintering device in which a laser-based optical system may be calibrated based at least in part on an image of static reference marks, according to some embodiments. Additive fabrication device 301 includes the same components as device 300 shown in FIG. 3A, but also includes fiducial target 321 marked on or otherwise attached to structures of the device. As noted above, shifts in the position and/or orientation of the camera may be identified by imaging fiducial targets such as targets 321. As a result, controller 312 may be configured to analyze the position(s) of fiducial targets 321 within an image produced from camera 310 to determine if the camera's position and/or orientation has shifted. If such a shift is detected, the mapping between pixel coordinates and build surface coordinates used in calibration based on calibration features may be adjusted according to how the position of the fiducial targets have moved within the image. In some cases, calibration processes that rely on calibration features may also check the fiducial targets as part of image analysis (that is, the analysis of an image may examine both fiducial and calibration features as described herein).

Figure 3C:
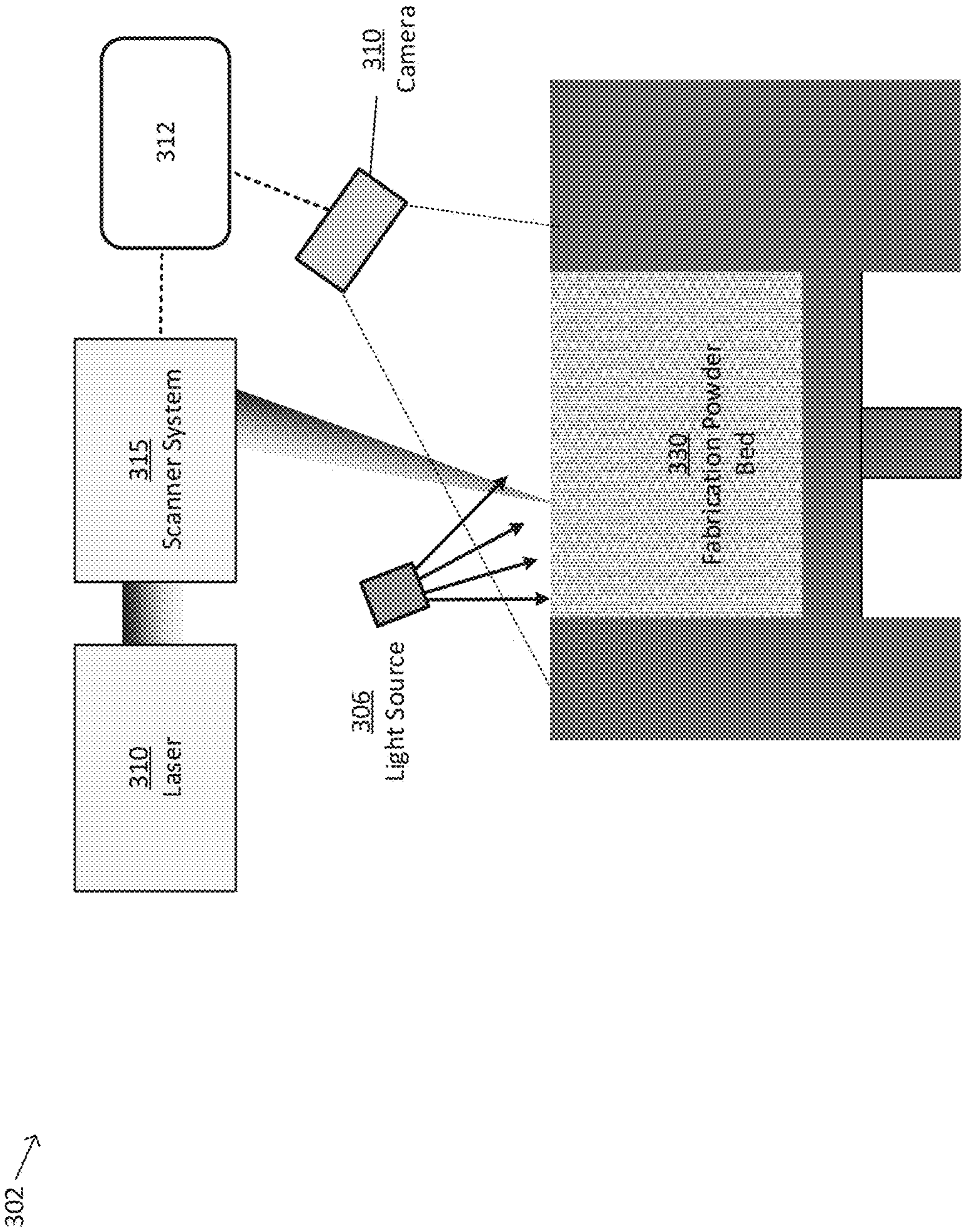
FIG. 3C depicts an illustrative selective laser sintering device in which a light source may produce features for calibration, and in which a laser-based optical system may be calibrated based on an image of said features, according to some embodiments.

FIG. 3C depicts an illustrative selective laser sintering device in which a laser-based optical system may be calibrated based on an image of features on a calibration plate, according to some embodiments. As an alternative to FIG. 3B, additive fabrication device 302 includes a light source 306 configured to produce fiducial targets on the surface of the powder bed 330. An advantage of the approach of FIG. 3C is that there may be no risk of the fiducial targets being covered with material such as powder, which may occur in the example of FIG. 3B. In some cases, of course, both the light source 306 of FIG. 3C and the fiducial targets 321 of FIG. 3B could be included in a single embodiment.

In some embodiments, light source 306 may comprise an optical fiber coupled to a housing and one or more lenses or other optical components to focus light from the fiber onto the build surface. In some embodiments, light source 306 may comprise an optical fiber arranged to direct project light onto the build surface. In the first case, the housing may act to protect the optical fiber from contamination, whereas in the second case the optical fiber could be mounted onto a suitable structure that would avoid sources of contaminants.

Figure 3D:
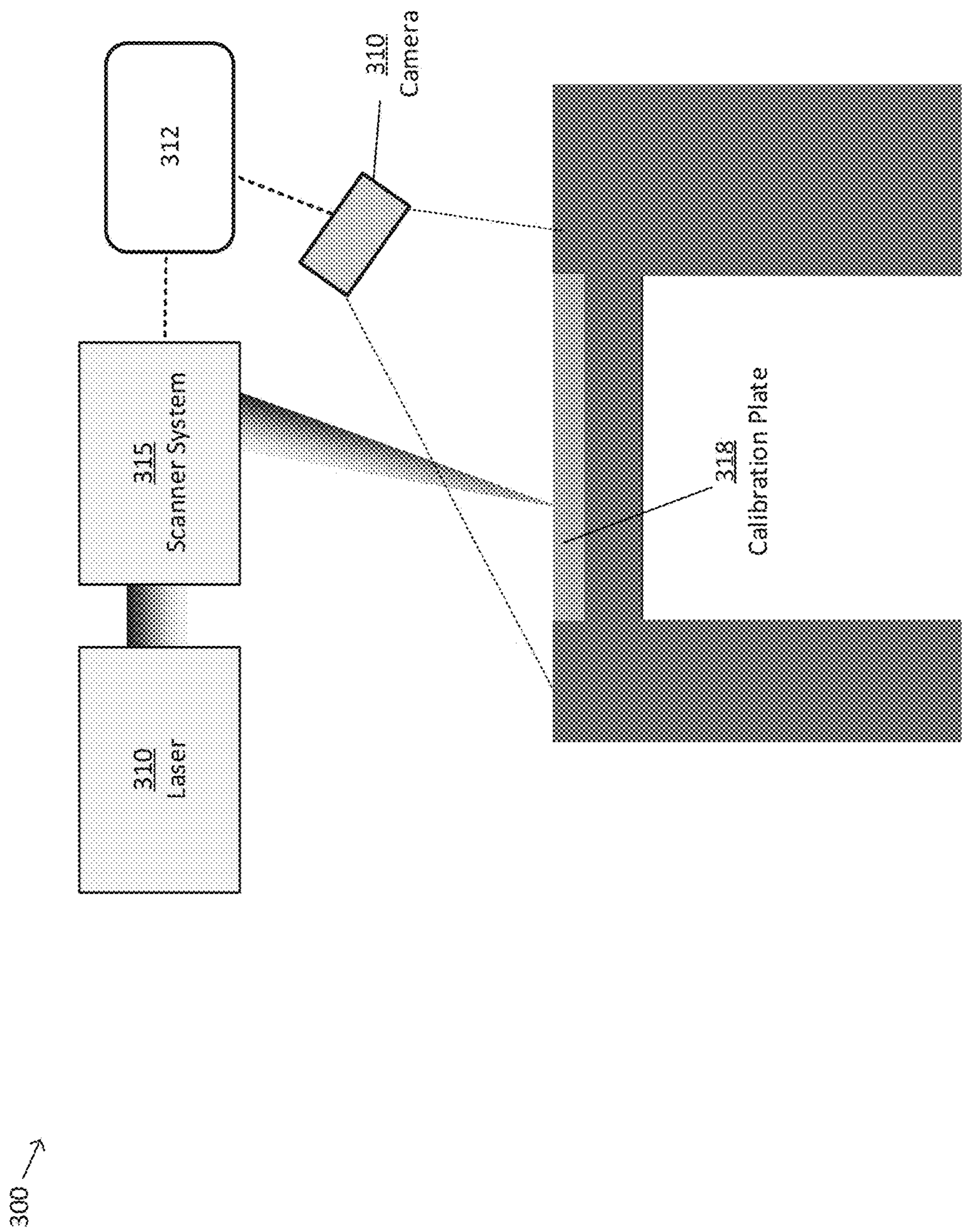
FIG. 3D depicts an illustrative selective laser sintering device in which a laser-based optical system may be calibrated based on an image of features on a calibration plate, according to some embodiments.

FIG. 3D depicts an illustrative selective laser sintering device in which a laser-based optical system may be calibrated based on an image of features on a calibration plate, according to some embodiments. The example of FIG. 3D depicts additive fabrication device 300 shown in FIG. 3A during calibration using a calibration plate 318. FIG. 3D may, for instance, represent an initial calibration process of device 300 in which the plate is arranged within the device so as to present calibration features at known locations. This process may be performed during initial setup of the device (e.g., at a factory) and/or by a user between fabrication operations by the device. In some cases, the calibration plate 318 may be machined to present the calibration features at a precise height when arranged within the device to mimic the height at which calibration features are generated by the optical system during calibration without the calibration plate.

Figure 4:
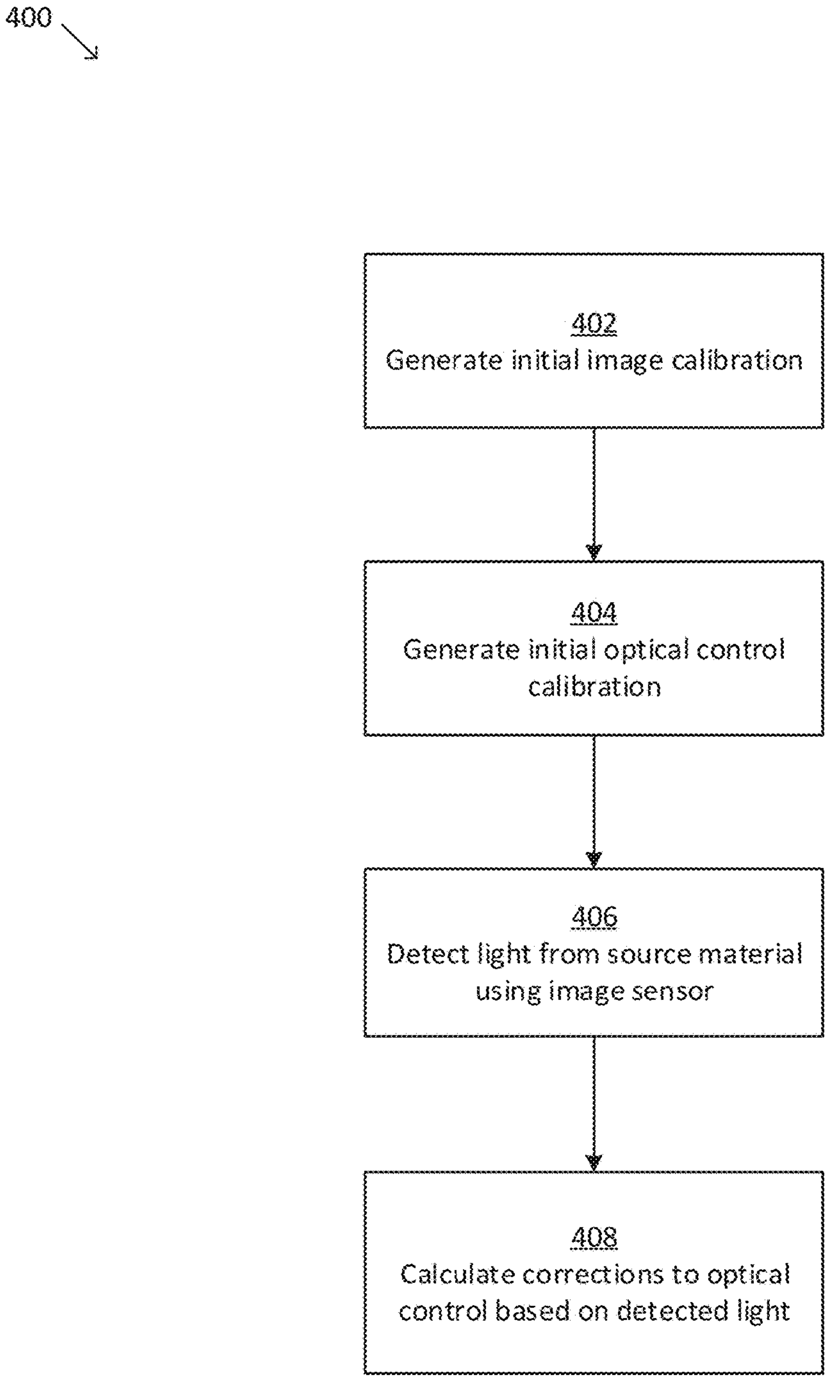
FIG. 4 is a flowchart of a method of calibrating an optical system based on an image of calibration features within an additive fabrication device, according to some embodiments.

FIG. 4 is a flowchart of a method of calibrating an optical system based on an image of calibration features within an additive fabrication device, according to some embodiments. Method 400 may be performed by a controller of an additive fabrication device, such as controller 212 shown in FIG. 2A or controller 312 of any of FIGS. 3A-3D.

In act 402 of method 400, the controller may generate an initial image calibration, which comprises a mapping between locations on a build surface (e.g., the surface of a powder bed in an SLS device) and corresponding locations within an image taken by an imaging device. Act 402 may comprise capturing an image of calibration features at known positions, such as but not limited to capturing an image of a calibration plate such as shown in FIG. 3D. Irrespective of how an image is captured of calibration features having known positions within the additive fabrication device, act 402 may comprise generating a mapping between the positions of calibration features within the image and the known positions of the targets within a two-dimensional region of the build surface. For instance, a suitable function (e.g., a polynomial function) may be optimized by determining the values of constants within the function that produce the best fit to map pixel coordinates to build surface coordinates.

In act 404 of method 400, the controller may generate an initial optical control calibration, which comprises a mapping between one or more control values of an optical system and locations on a build surface (e.g., the surface of a powder bed in an SLS device). As discussed above, the controller may provide one or more control values to the light source (or optical components associated with the light source) to control where the light source directs light.

According to some embodiments, in act 404, a mapping between the control values and the build surface coordinates may be generated by generating calibration features using the optical system using particular control values and determining the build surface coordinates of the calibration features (e.g., using the mapping determined in act 402 to map where the targets appear in the image into build surface coordinates). For example, if the control values are values provided to one or more mirror galvanometers of the optical system, the optical system may be controlled to produce light for particular control values and positions on the build surface determined for each light, thereby indicating a mapping between galvanometer control values and (X,Y) position on the build surface.

According to some embodiments, in act 404, a mapping between the control values and the build surface coordinates may be generated by directing light from the optical system onto a structure comprising holes or other non-reflective features, and detecting an amount of light scattered from the structure for various control values of the optical system using a light sensor. Since the holes or other non-reflective features may be captured by an image, build surface positions in the image corresponding to the features may be determined (e.g., using the mapping determined in act 402 to map where the features appear in the image into build surface coordinates). Furthermore, the control values of the optical system that are directed to the features may be determined by identifying an amount of light scattered from the structure.

In each of the above two techniques for generating a mapping between the control values and the build surface coordinates, a suitable function (e.g., a polynomial function) may be optimized by determining the values of constants within the function that produce the best fit to map build surface coordinates to optical system control values.

Acts 402 and 404 may represent initial calibrations of an optical system and may be performed during initial configuration of the additive fabrication device in addition to any suitable subsequent times. These acts may for instance allow a replacement optical system to be calibrated by a user without it being necessary for the user to ship the device back to the manufacturer. In some cases, either or both acts may be performed as part of typical maintenance of the device to confirm that the optical system is operating as intended. In some cases, either or both acts may be performed during a fabrication process (e.g., between layers) to confirm proper calibration of the optical system during fabrication. Calibration during fabrication may include generating calibration features in an area around the build surface and/or in a corner or other unused area of the build surface.

Act 406 of method 400 may comprise operating the optical system of the additive fabrication device to produce calibration features on the build surface and generating an image of the build surface. The mappings determined in act 402 and 404 may be utilized to determine whether the calibration features appear in the expected positions on the build surface by determining the location in pixel space that the targets appear in the image and mapping that to build surface coordinates. If all of the targets have build surface coordinates as expected, no further calibration may be necessary. Otherwise, in act 408 corrections to the optical system may be calculated based on the determined build surface positions of the targets (whether relative to expected, or absolute).

Act 406 may comprise one or more image processing operations to more accurately identify the calibration features in the image, such as contrast adjustments, thresholding, noise removal, or combinations thereof. Furthermore, act 406 may comprise image analysis operations to identify a position of the calibration feature(s) in pixel space, such as the center of the target in the image, which may be a non-integer pixel coordinate value if, for instance, the targets are spread over multiple pixels.

According to some embodiments, image analysis in act 406 may comprise identifying the calibration features via one or more feature detection processes, such as but not limited to blob detection, edge detection, and/or corner detection. Feature detection processes may operate based on any combination of brightness, color saturation, and/or hue for the pixels of the image. For instance, blob detection based on brightness may be performed, and/or edge detection based on color saturation, etc. In some embodiments, act 406 may also comprise finding the centroid of a region of the image identified as being a calibration feature (e.g., using blob detection to detect the edges of a calibration feature within the image, then finding the centroid of that region to identify the position of the target in pixel space).

According to some embodiments, act 408 may comprise determining a new mapping between one or more control values of the optical system and locations on a build surface, as was determined previously in act 404. As such, 'corrections' to the calibration determined in act 408 may comprise replacement values for the calibration previously determined, rather than adjustments performed thereof. For instance, in cases in which the calibration features do not all appear at the expected locations, the control values that were input to the optical system to produce the calibration features may be the basis of a newly determined mapping between those control values and the measured positions of the targets on the build surface.

In some cases, acts 406 and 408 may be repeated one or more times to confirm the new calibration is accurate and the calibration features are appearing at the expected locations on the build surface.

In some embodiments, acts 406 and 408 may be performed prior to fabrication, subsequent to fabrication, and/or during fabrication (e.g., during fabrication of a layer, between fabrication of successive layers). In some use cases, once acts 402 and 404 have been performed during initial calibration of the device or as a result of repair to the device, acts 402 and 404 may not necessarily be performed during regular usage, since acts 406 and 408 may enable correction of any subsequent drift in the optical system.

In some embodiments, subsequent to act 408, acts 404 and 406 may be performed again one or more times. In some cases, it may be valuable to confirm that the calibration in act 408 is accurate by repeating these acts. In some embodiments, subsequent to act 408, acts 404, 406 and 408 may be performed again one or more times. In some cases, calibration may be iterative, and it may be valuable to confirm that the calibration in act 408 is accurate, and if not sufficiently accurate, to repeat the calibration of act 408, test the calibration again in acts 404 and 406, etc. until a sufficiently accurate calibration is confirmed.

Figure 5:
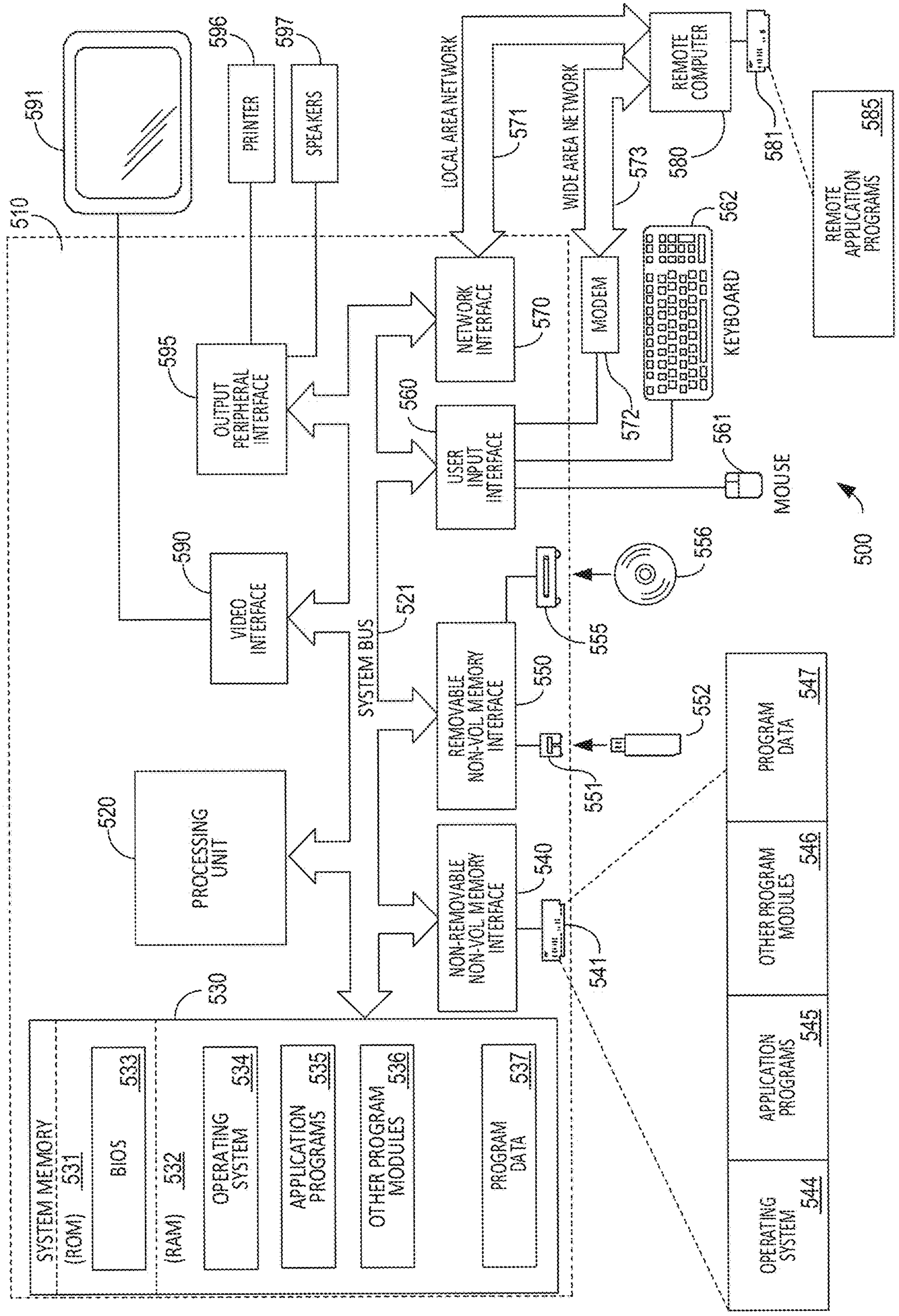
FIG. 5 illustrates an example of a computing system environment on which aspects of the invention may be implemented.

FIG. 5 illustrates an example of a suitable computing system environment 500 on which the technology described herein may be implemented. For example, computing environment 500 may form part of the additive fabrication device 100 shown in FIG. 1, device 200 shown in FIG. 2A, or device 300 shown in any of FIGS. 3A-3D. The computing system environment 500 is only one example of a suitable computing environment and is not intended to suggest any limitation as to the scope of use or functionality of the technology described herein. Neither should the computing environment 500 be interpreted as having any dependency or requirement relating to any one or combination of components illustrated in the exemplary operating environment 500.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 5, an exemplary system for implementing the technology described herein includes a general purpose computing device in the form of a computer 510. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a flash drive 551 that reads from or writes to a removable, nonvolatile memory 552 such as flash memory, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5, provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semi-custom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method comprising:

obtaining an image of a surface of a powder bed in an additive fabrication device, wherein the image includes a plurality of calibration features produced directly on the powder bed by an optical system of the additive fabrication device;

determining, by at least one processor based on positions of one or more of the plurality of calibration features within the image, a mapping between pixel coordinates in the image and coordinates on the surface of the powder bed; and determining, by the at least one processor, one or more control values for the optical system of the additive fabrication device based on the mapping between the pixel coordinates in the image and the coordinates on the surface of the powder bed.

2. The method of claim 1, wherein determining the mapping between the pixel coordinates in the image and the coordinates on the surface of the powder bed comprises performing one or more feature detection processes to detect at least part of one or more of the plurality of calibration features.

3. The method of claim 2, wherein the one or more feature detection processes include blob detection, edge detection and/or corner detection.

4. The method of claim 1, further comprising determining, by the at least one processor, a mapping between the coordinates on the surface of the powder bed and initial values of the one or more control values used to control the optical system when producing the plurality of calibration features.

5. The method of claim 1, wherein determining the one or more control values for the optical system of the additive fabrication device comprises determining corrections to initial values of the one or more control values used to control the optical system when producing the plurality of calibration features.

6. The method of claim 1, further comprising operating, by the at least one processor, the additive fabrication device to fabricate one or more parts at least in part by operating the optical system, using the one or more control values, to direct light onto the powder bed.

7. The method of claim 1, wherein the plurality of calibration features include a plurality of regions on the surface of the powder bed that are illuminated by the optical system.

8. The method of claim 1, wherein the plurality of calibration features include a plurality of regions of consolidated powder.

9. An additive fabrication device comprising:

an optical system configured to direct light onto a surface of a powder bed of the additive fabrication device;

an image sensor configured to image the powder bed;

at least one processor; and at least one computer readable medium comprising instructions that, when executed by the at least one processor:

operate the optical system to produce a plurality of calibration features directly on the surface of the powder bed;

generate, using the image sensor, an image of the plurality of calibration features;

determine, based on positions of one or more of the plurality of calibration features within the image, a mapping between pixel coordinates in the image and coordinates on the surface of the powder bed; and determine one or more control values for the optical system based on the mapping between the pixel coordinates in the image and the coordinates on the surface of the powder bed.

10. The additive fabrication device of claim 9, wherein determining the mapping between the pixel coordinates in the image and the coordinates on the surface of the powder bed comprises performing one or more feature detection processes to detect at least part of one or more of the plurality of calibration features.

11. The additive fabrication device of claim 10, wherein the one or more feature detection processes include blob detection, edge detection and/or corner detection.

12. The additive fabrication device of claim 9, wherein the instructions are further configured to, when executed by the at least one processor, determine a mapping between the coordinates on the surface of the powder bed and initial values of the one or more control values used to control the optical system when producing the plurality of calibration features.

13. The additive fabrication device of claim 9, wherein determining the one or more control values for the optical system comprises determining corrections to initial values of the one or more control values used to control the optical system when producing the plurality of calibration features.

14. The additive fabrication device of claim 9, further comprising operating, by the at least one processor, the additive fabrication device to fabricate one or more parts at least in part by operating the optical system, using the one or more control values, to direct light onto the powder bed.

15. The additive fabrication device of claim 9, wherein operating the optical system to produce the plurality of calibration features comprising operating the optical system to illuminate a plurality of regions of the surface of the powder bed.

16. The additive fabrication device of claim 9, wherein operating the optical system to produce the plurality of calibration features comprising operating the optical system to consolidate a plurality of regions of powder within the powder bed.

17. An additive fabrication device comprising:

a fabrication bed;

a material deposition mechanism configured to deposit source material over the fabrication bed;

an optical system configured to direct light onto a surface of a powder bed;

an image sensor configured to image the powder bed;

at least one processor; and at least one computer readable medium comprising instructions that, when executed by the at least one processor during a process in which a plurality of parts are being fabricated in the powder bed by operating the material deposition mechanism to repeatedly deposit a layer of powder over the fabrication bed and operating the optical system to consolidate regions of powder in the powder bed:

operate the optical system to produce a plurality of calibration features directly on the surface of the powder bed;

generate, using the image sensor, an image of the surface of the plurality of calibration features on the powder bed;

detect, based on positions of one or more of the plurality of calibration features within the image, a drift in the optical system; and perform at least one corrective action in response to detecting the drift in the optical system.

18. The additive fabrication device of claim 17, wherein the at least one corrective action comprises aborting fabrication of the plurality of parts by the additive fabrication device.

19. The additive fabrication device of claim 17, wherein the at least one corrective action comprises generating a warning to a user indicating that a drift in the optical system has occurred.

20. The additive fabrication device of claim 17, wherein the at least one corrective action comprises:

determining one or more control values for the optical system based on the positions of the one or more calibration features within the image; and continuing fabrication of the plurality of parts by the additive fabrication device in part by operating the optical system to consolidate regions of powder in the powder bed using the one or more control values.

21. The additive fabrication device of claim 17, wherein operating the optical system to produce the plurality of calibration features comprising operating the optical system to illuminate a plurality of regions on the surface of the powder.

22. The additive fabrication device of claim 17, wherein operating the optical system to produce the plurality of calibration features comprising operating the optical system to consolidate a plurality of regions of powder.

* * * * *